United States Patent

Schulze et al.

[11] Patent Number: 5,797,473
[45] Date of Patent: Aug. 25, 1998

[54] WINDER SHAFT

[75] Inventors: Reiner Schulze; Gerd Hebbel, both of Hamburg, Germany

[73] Assignee: Beiersdorf AG, Hamburg, Germany

[21] Appl. No.: 634,451

[22] Filed: Apr. 18, 1996

[30] Foreign Application Priority Data

May 11, 1995 [DE] Germany ............ 195 17 225.6

[51] Int. Cl.[6] .................. F16D 13/14; F16D 25/04; B65G 75/18
[52] U.S. Cl. .................. 192/77; 192/85 AT; 192/88 B; 242/571.1
[58] Field of Search .................. 192/88 B, 88 R, 192/77, 85 AT, 48.8, 75, 76; 242/571.1, 575.1, 571.2; 403/5; 279/2.05, 2.06, 2.08

[56] References Cited

U.S. PATENT DOCUMENTS

| | | | |
|---|---|---|---|
| 1,297,809 | 3/1919 | Dixon et al. | 242/571.1 |
| 1,979,423 | 11/1934 | Tondreau | 242/575.1 |
| 2,062,421 | 12/1936 | Lindbom | 279/2.08 X |
| 2,562,466 | 7/1951 | Kesterton | 192/77 |
| 2,801,694 | 8/1957 | Schneider et al. | 279/2.08 X |
| 3,519,217 | 7/1970 | Enners | 242/575.1 |
| 3,817,468 | 6/1974 | Smolderen et al. | |
| 4,201,352 | 5/1980 | Madachy | 242/571.1 X |
| 4,220,291 | 9/1980 | Papa | 242/571.1 X |
| 4,461,430 | 7/1984 | Lever | 242/571.1 X |

FOREIGN PATENT DOCUMENTS

| | | |
|---|---|---|
| 1143074 | 1/1963 | Germany . |
| 1237398 | 3/1967 | Germany . |
| 3918863 | 12/1990 | Germany . |
| 62-41144 | 2/1987 | Japan . |
| 2-132043 | 5/1990 | Japan . |

*Primary Examiner*—Rodney H. Bonck
*Attorney, Agent, or Firm*—Sprung Kramer Schaefer & Briscoe

[57] ABSTRACT

Winder shaft for clamping one or more cores onto one or more core carriers, which are arranged on the winder shaft alongside one another in the axial direction, and transmitting producing a torque to the core carriers for winding material to be wound, having means for the deliberate output of a radially outwardly acting force located in the winder shaft, whereby, as a result of the outwardly acting forces, one or more friction tongues (41) in each core carrier (1), can be pressed radially against the transmission element (5) of the respective core carrier to transmit torque thereto, which serves to drive the transmission element (5).

2 Claims, 1 Drawing Sheet

WINDER SHAFT

BACKGROUND OF THE INVENTION

The invention relates to a winder shaft for clamping one or more cores on one or more core carriers, which are arranged on the winder shaft alongside one another in the axial direction, and for producing a torque in the core carriers for winding material to be wound, especially self-adhesive tapes.

The winding of material to be wound onto cores, which are arranged individually or plurally on winder shafts, and are driven by using core carriers, is prior art. A core carrier of this type must fulfill a multi plicity of requirements placed upon it:

It must be possible to transmit a reproducible and simultaneously controllable winder torque.

The core carrier must be able to be clamped at a defined point on a winder shaft.

The core carrier should have only a low weight.

It must be distinguished by a long lifetime, coupled with excellent maintainability.

Various constructions are proposed to solve the object set, but fulfill the requirements only conditionally.

DESCRIPTION OF THE RELATED ART

DE-OS 39 18 863 discloses a winder shaft having a plurality of winder cores lined up in a row, to which at least one frictional element is assigned. The frictional connection between winder shaft and the winder cores is adjustable. This is achieved in terms of construction by each friction element having at least one outer ring and a carrying ring rotatably mounted thereon, on the inside of which it is possible to press radially adjustable friction elements with the aid of hydraulic hoses which, for their part, are incorporated in longitudinal grooves within the winder shaft which are of essentially T-shaped design in cross-section and are distributed over their circumference, and on whose outer circumference there are arranged clamping elements which can be adjusted and locked over the outer circumference of the carrying ring. The friction elements have disadvantages, however. Thus, each friction element consists of a large number of individual parts, which leads to very high costs in production. Furthermore, in the construction described of the frictional element, exchanging the wearing parts, such as carrying ring and outer ring, can be ensured only in a very time-consuming and hence personnel-intensive manner because of the screws which are used in the construction. Also, the deliberate setting of a desired friction is possible only to a limited extent because of the complicated force flow through the friction elements.

SUMMARY OF THE INVENTION

The invention is, then, based on the object of providing a winder core with such core carriers in such a way that the disadvantages of the prior art do not occur or at least not to the same extent and, at the same time, the set requirements are fulfilled by the core carriers of the winder shaft.

To achieve this object, a winder shaft is proposed which is equipped with one or more core carriers and is characterized in more detail in the patent claims.

Arranged on the winder shaft are one or more core carriers which serve for clamping one or more cores. Provided in the winder shaft is a device which makes possible the deliberate output of a radially outwardly acting force which can be selected freely within a large range. This device can preferably comprise a pressure hose whose internal pressure—and hence the force mentioned—can be predetermined arbitrarily within a wide range.

In each individual core carrier, which preferably comprises the two components a running bush and a transmission element arranged on the running bush, the force applied by the corresponding device acts on one or more friction tongues, each of which is located in at least one cutout in the running surface of the running bush. The friction tongues are preferably connected in a captive manner to the running bush, with the result that the entire running bush component can be produced particularly simply from a single workpiece. Because of their flexibility, the friction tongues are pressed against the transmission element. The friction resulting from this between friction tongue and transmission element causes a torque. This torque effects the drive of the transmission element on the running bush.

In order to clamp the core carriers on the winder shaft axially firmly against each other at an exactly defined position, the running bush of each core carrier has a shoulder at the rim. The shoulder has the simultaneous effect that, after the clamping, a small interspace remains between the individual transmission elements of the core carriers, with the result that mutual influencing of the transmission elements during their rotation is excluded.

Starting materials such as plastic, steel and/or metals such as brass can be used for the core carrier. All the components of the core carrier preferably consist of one or more types of plastic.

The winder shaft according to the invention, with the core carriers, has a series of advantages. The winder torque for each individual core carrier is reproducible and controllable, since mutual influencing of the core carriers transmitting the individual frictions is excluded when they are arranged on one winder shaft. In this way, a desired winding characteristic can be set, that is to say data which are relevant to the quality of the subsequent reel and technically important data can be predetermined externally, as is desired in particular in the course of DIN ISO 9000. The clever regulation of the friction prevents the formation of piping in the reel and the telescoping of the finished reel.

Displacement of a core is excluded, since the core carriers cannot be displaced on the winder shaft when pushing on the cores, because of the shoulder on the rim of the running bush. This shoulder also ensures that the individual core carriers on the winder shaft can be clamped at a defined point.

Because of the low number of individual parts from which the core carrier consists, cost-effective production of the entire winder shaft is possible. Furthermore, the comparatively simple construction ensures very good maintainability with very low wear phenomena. In the case of the preferred production of the entire core carrier from plastic, a low weight of the core carrier and hence of the entire winder shaft equipped with a plurality of core carriers is achieved, especially if the winder shaft is additionally designed to be hollow.

A material pairing between transmission element and friction tongue which has proven particularly advantageous is plastic/plastic, in particular, for example, the combination of Novatron HPV® from the PolyPenco Company and Delrin® from the Dupont Company, in order to obtain very low wear and thus high stability of the core carrier. In addition, however, particularly if the friction tongues are not worked directly out of the running surface of the running bush and are thus not firmly connected to the latter, friction tongues which are separable from the running bush can be of any desired material in order to match the properties of the core carrier to the predetermined requirements.

A preferred embodiment of the invention is given by way of explanation in the drawings, without thereby wishing to restrict the invention unnecessarily.

Figure 1:
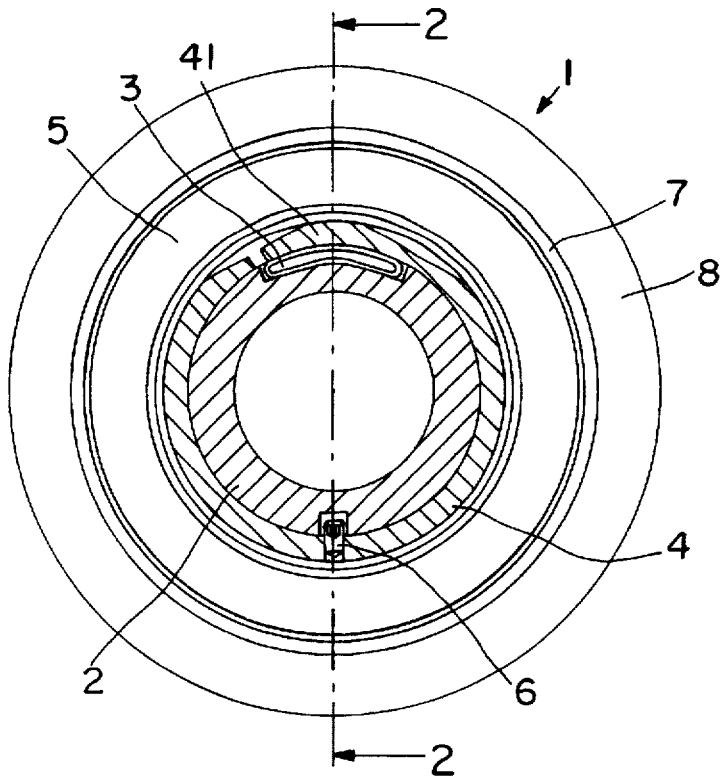
FIG. 1 is a lateral cross-sectional view of the winder shaft of the invention.

Shown in FIG. 1 is a core carrier (1), with which the winder shaft (2) is equipped, in lateral section. The core carrier is seated on the winder shaft (2), into which a pressure hose (3) is let and which is particularly advantageously of hollow design. The running bush (4) is connected, as shown, to a driver (6) or is connected to the winder shaft (2) by means of another suitable measure. A friction tongue (41), serving to produce the friction, is machined out of the running surface of the running bush (4). This frictional force, with which the friction tongue (41) is pressed onto the transmission element (5), can be regulated by the pressure sure selected in the hydraulic hose (3).

The transmission element (5) in the form shown represents one possible embodiment of a component between the running bush (4) and the core (7). The transmission element (5) ensures in a suitable way the transmission of the frictional connection between winder shaft (2) and core (7), as well as the axial and radial clamping of the core (7).

During the rotation of the running bush (4) with the winder shaft (2), there occurs between the friction tongue (41) and the running surface of the transmission. element (5) a certain frictional force which, as mentioned above, can be selected arbitrarily by raising or lowering the pressure in the hydraulic hose (3). This results in a specific torque which sets the transmission element (5) rotating, but with a lower rate of rotation than the running bush (4). Wound material (8) is already located on the core (7).

Figure 2:
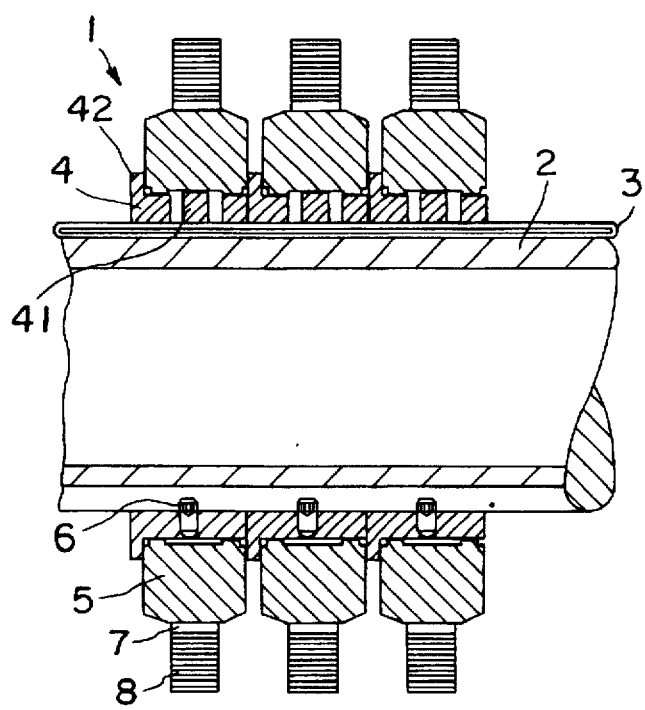
FIG. 2 shows a sectional view of the section depicted as A—A in FIG. 1.

FIG. 2 shows, in section according to the line A—A according to FIG. 1, a winder shaft (2) on which a plurality of core carriers (1) are arranged alongside one another. The shoulder (42) provided on the running bush (4) separates the individual core carriers (1) from one another and simultaneously enables the running bushes (4) of the core carrier (1) to be clamped firmly axially to one another, with the result that the latter assume an exactly predetermined geometric position. The winder shaft (2) has a groove (21) which serves to accommodate the driver (6).

Any feed lines which may be present within the winder shaft (2) for compressed air or other pressure means are not shown in more detail.

We claim:

1. A winder shaft (2) having one or more core carriers mounted thereon, said shaft having means for producing a radially outwardly acting force, said core carriers each comprising a running bush over said shaft and a transmission element over said running bush, said running bush having a running surface provided with at least one cutout and being drivably connected to said winder shaft and having at least one adjustable friction tongue (41) which is arranged in said at least one cutout in the running surface of the running bush for adjustably frictionally engaging said transmission element, and is connected inseparably to said running bush, whereby in operation, said means for producing a radially outwardly acting force exerts a radially outwardly acting force against said friction tongue and causes said friction tongue to frictionally engage said transmission element, so that when said shaft is caused to rotate, rotational torque is adjustably transmitted from said rotating shaft to said transmission element.

2. A winder shaft (2) having one or more core carriers mounted thereon, said shaft having means for producing a radially outwardly acting force, said core carriers each comprising a running bush over said shaft and a transmission element over said running bush, said running bush having a running surface provided with at least one cutout and a shoulder for separating the core carriers when a plurality of them is mounted on said winder shaft, and being drivably connected to said winder shaft and having at least one adjustable friction tongue (41) which is arranged in said at least one cutout in the running surface of the running bush for adjustably frictionally engaging said transmission element, whereby in operation, said means for producing a radially outwardly acting force exerts a radially outwardly acting force against said friction tongue and causes said friction tongue to frictionally engage said transmission element, so that when said shaft is caused to rotate, rotational torque is adjustably transmitted from said rotating shaft to said transmission element.

* * * * *